US008295602B2

(12) United States Patent
Enomoto

(10) Patent No.: US 8,295,602 B2
(45) Date of Patent: Oct. 23, 2012

(54) IMAGE PROCESSING APPARATUS AND IMAGE PROCESSING METHOD

(75) Inventor: Makoto Enomoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 501 days.

(21) Appl. No.: 12/629,728

(22) Filed: Dec. 2, 2009

(65) Prior Publication Data

US 2010/0142810 A1 Jun. 10, 2010

(30) Foreign Application Priority Data

Dec. 5, 2008 (JP) ................................ 2008-311229

(51) Int. Cl.
*G06K 9/62* (2006.01)

(52) U.S. Cl. ........................................................ 382/187

(58) Field of Classification Search ........................ None
See application file for complete search history.

(56) References Cited

U.S. PATENT DOCUMENTS 6,404,921 B1 6/2002 Ishida
2005/0238244 A1 10/2005 Uzawa
2007/0055885 A1* 3/2007 Yamazaki et al. ............ 713/176
2008/0144936 A1* 6/2008 Nishikawa .................... 382/177

FOREIGN PATENT DOCUMENTS

| | | | |
|---|---|---|---|
| JP | 09-009161 | A | 1/1997 |
| JP | 11-167532 | A | 6/1999 |
| JP | 2006-345314 | A | 12/2006 |
| JP | 2007-013550 | A | 1/2007 |
| JP | 2007-028181 | A | 2/2007 |
| JP | 2007-249435 | A | 9/2007 |
| JP | 2008-009897 | A | 1/2008 |

* cited by examiner

*Primary Examiner* — Brian P Werner
(74) *Attorney, Agent, or Firm* — Canon USA Inc IP Division

(57) ABSTRACT

An image processing apparatus performs character recognition processing on a character image in a character area to obtain character code data, and performs vectorization processing on the character image in the character area to obtain vector data. Based on the rule set for each of a plurality of color information definitions and the character color of the character image, the image processing apparatus generates a plurality of color information definitions that define colors to be used in rendering the character code data and the vector data, so that an electronic document is generated that contains the character code data, the vector data, and the plurality of color information definitions.

10 Claims, 18 Drawing Sheets

FIG.4

| COLOR INFORMATION DEFINITION NAME | OBJECT TYPE | ALPHA CHANNEL VALUE |
|---|---|---|
| OCR DISPLAY | OCR | 100% |
| | VECTOR | 0% |
| OUTLINE DISPLAY | OCR | 0% |
| | VECTOR | 100% |

FIG.6

| CHARACTER AREA | POSITION | CHARACTER SIZE | CHARACTER COLOR | CHARACTER RECOGNITION RESULT |
| --- | --- | --- | --- | --- |
| 501 | (120,30)-(250,70) | 40pt | #000000 | ABC |
| 502 | (120,80)-(250,120) | 40pt | #0000FF | DEF |

FIG.7

| | OCR DISPLAY | | VECTOR DISPLAY | |
|---|---|---|---|---|
| COLOR ID | RGB | ALPHA CHANNEL | RGB | ALPHA CHANNEL |
| clr1 | #000000 | 100% | #000000 | 0% (TRANSPARENT) |
| clr2 | #0000FF | 100% | #0000FF | 0% (TRANSPARENT) |
| clr3 | #000000 | 0% (TRANSPARENT) | #000000 | 100% |
| clr4 | #0000FF | 0% (TRANSPARENT) | #0000FF | 100% |

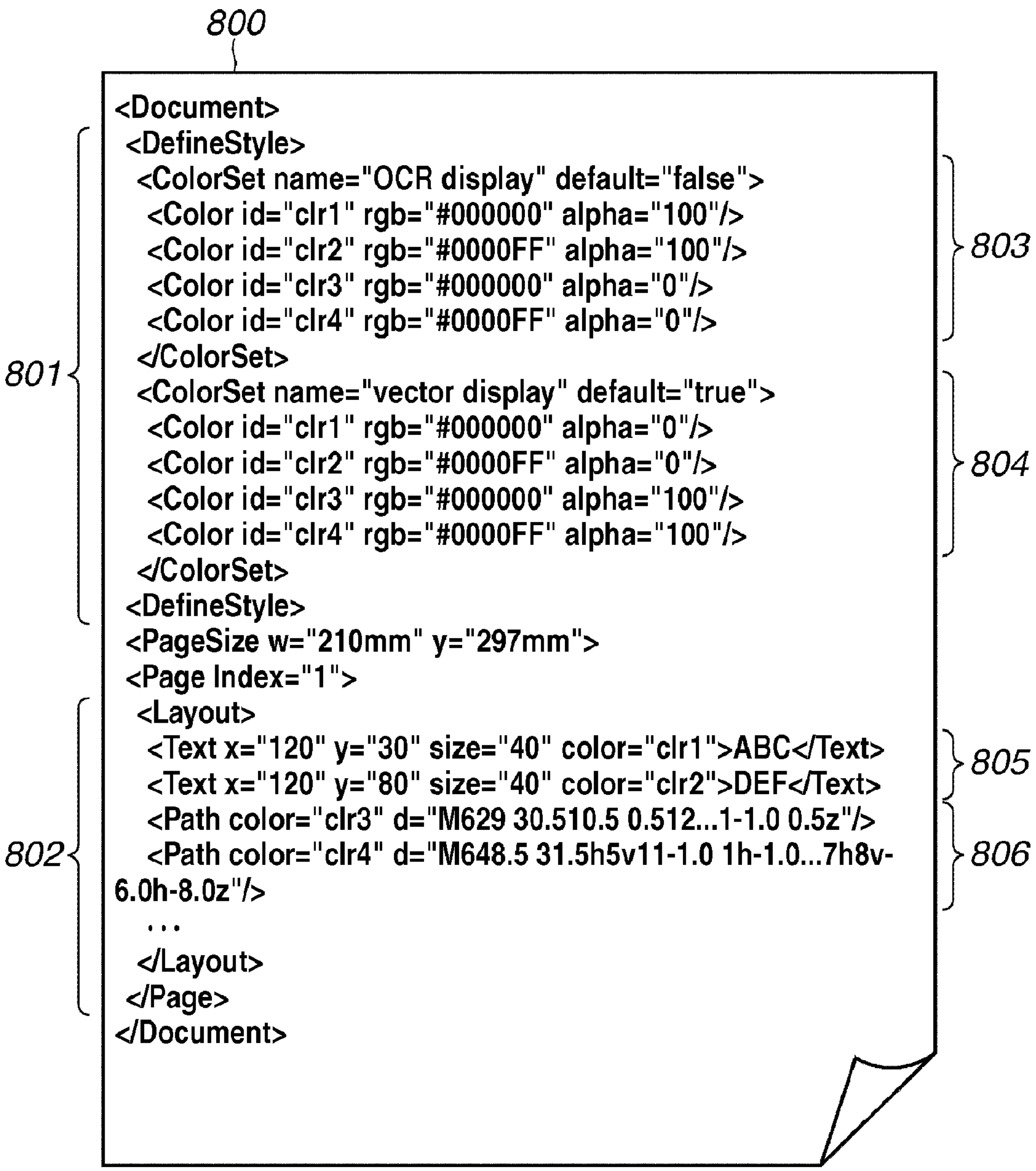

FIG.8

```
<Document>
 <DefineStyle>
  <ColorSet name="OCR display" default="false">
   <Color id="clr1" rgb="#000000" alpha="100"/>
   <Color id="clr2" rgb="#0000FF" alpha="100"/>
   <Color id="clr3" rgb="#000000" alpha="0"/>
   <Color id="clr4" rgb="#0000FF" alpha="0"/>
  </ColorSet>
  <ColorSet name="vector display" default="true">
   <Color id="clr1" rgb="#000000" alpha="0"/>
   <Color id="clr2" rgb="#0000FF" alpha="0"/>
   <Color id="clr3" rgb="#000000" alpha="100"/>
   <Color id="clr4" rgb="#0000FF" alpha="100"/>
  </ColorSet>
 <DefineStyle>
 <PageSize w="210mm" y="297mm">
 <Page Index="1">
  <Layout>
   <Text x="120" y="30" size="40" color="clr1">ABC</Text>
   <Text x="120" y="80" size="40" color="clr2">DEF</Text>
   <Path color="clr3" d="M629 30.510.5 0.512...1-1.0 0.5z"/>
   <Path color="clr4" d="M648.5 31.5h5v11-1.0 1h-1.0...7h8v-6.0h-8.0z"/>
   ...
  </Layout>
 </Page>
</Document>
```

FIG.11

| COLOR INFORMATION DEFINITION NAME | OBJECT TYPE | CHARACTER RECOGNITION ACCURACY | ALPHA CHANNEL VALUE |
|---|---|---|---|
| ALL OCR DISPLAY | OCR | ALL | 100% |
| | VECTOR | ALL | 0% |
| MIDDLE ACCURACY OCR DISPLAY | OCR | MORE THAN Middle | 100% |
| | | LESS THAN Middle | 0% |
| | VECTOR | MORE THAN Middle | 0% |
| | | LESS THAN Middle | 100% |
| HIGH ACCURACY OCR DISPLAY | OCR | MORE THAN High | 100% |
| | | LESS THAN High | 0% |
| | VECTOR | MORE THAN High | 0% |
| | | LESS THAN High | 100% |
| ALL VECTOR DISPLAY | OCR | ALL | 0% |
| | VECTOR | ALL | 100% |

FIG.13

| CHARACTER AREA | POSITION | CHARACTER SIZE | CHARACTER COLOR | CHARACTER RECOGNITION RESULT | RECOGNITION ACCURACY |
|---|---|---|---|---|---|
| 1201 | (120,30)-(250,70) | 40pt | #000000 | ABC | High |
| 1202 | (120,80)-(250,120) | 40pt | #0000FF | DEF | Middle |
| 1203 | (120,130)-(270,170) | 40pt | #000000 | UVVV | Low |
| 1204 | (120,180)-(260,220) | 40pt | #FF0000 | XYZ | High |

FIG.14

| | All OCR Display | | Middle Accuracy OCR Display | | High Accuracy OCR Display | | All Vector Display | |
|---|---|---|---|---|---|---|---|---|
| COLOR ID | RGB | ALPHA CHANNEL | RGB | ALPHA CHANNEL | RGB | ALPHA CHANNEL | RGB | ALPHA CHANNEL |
| clr1 | #000000 | 100% | #000000 | 100% | #000000 | 100% | #000000 | 0% |
| clr2 | #0000FF | 100% | #0000FF | 100% | #0000FF | 0% | #0000FF | 0% |
| clr3 | #000000 | 100% | #000000 | 0% | #000000 | 0% | #000000 | 0% |
| clr4 | #FF0000 | 100% | #FF0000 | 100% | #FF0000 | 100% | #FF0000 | 0% |
| clr5 | #000000 | 0% | #000000 | 0% | #000000 | 0% | #000000 | 100% |
| clr6 | #0000FF | 0% | #0000FF | 0% | #0000FF | 100% | #0000FF | 100% |
| clr7 | #000000 | 0% | #000000 | 100% | #000000 | 100% | #000000 | 100% |
| clr8 | #FF0000 | 0% | #FF0000 | 0% | #FF0000 | 0% | #FF0000 | 100% |

```
<Document>
 <DefineStyle>                                                        1501
  <ColorSet name="all OCR display" default="false">                   1503
   <Color id="clr1" rgb="#000000" alpha="100"/>
   <Color id="clr2" rgb="#0000FF" alpha="100"/>
   <Color id="clr3" rgb="#000000" alpha="100"/>
   <Color id="clr4" rgb="#FF0000" alpha="100"/>
   <Color id="clr5" rgb="#000000" alpha="0"/>
   <Color id="clr6" rgb="#0000FF" alpha="0"/>
   <Color id="clr7" rgb="#000000" alpha="0"/>
   <Color id="clr8" rgb="#FF0000" alpha="0"/>
  </ColorSet>
  <ColorSet name="middle accuracy OCR display" default="false">       1504
   <Color id="clr1" rgb="#000000" alpha="100"/>
   <Color id="clr2" rgb="#0000FF" alpha="100"/>
   <Color id="clr3" rgb="#000000" alpha="0"/>
   <Color id="clr4" rgb="#FF0000" alpha="100"/>
   ......
  </ColorSet>
  <ColorSet name="high accuracy OCR display" default="false">         1505
    ......
  </ColorSet>
  <ColorSet name="all vector display" default="true">                 1506
   ......
  </ColorSet>
 </DefineStyle>
 <PageSize w="210mm" y="297mm">
 <Page Index="1">                                                     1502
  <Layout>
   <Text x="120" y="30" size="40" color="clr1">ABC</Text>             1507
   <Text x="120" y="80" size="40" color="clr2">DEF</Text>
   <Text x="120" y="130" size="40" color="clr3">UVVV</Text>
   <Text x="120" y="180" size="40" color="clr4">XYZ</Text>
   <Path color="clr3" d="M629 30.510.5 0.512...1-1.0 0.5z"/>          1508
   <Path color="clr4" d="M648.5 31.5h5v11-1.0 1h-1.0...7h8v-6.0h-8.0z"/>
   ......
  </Layout>
 </Page>
</Document>
```

IMAGE PROCESSING APPARATUS AND IMAGE PROCESSING METHOD

BACKGROUND OF THE INVENTION

1. Field of the Invention

The present invention relates to an image processing apparatus and an image processing method for storing a plurality of pieces of image-processed data in a format easy to use.

2. Description of the Related Art

The recent wide spread of network such as the Internet has enabled distribution of electronic documents. But still, the electronic documents are often printed on paper for distribution.

Technologies for electronically utilizing paper document, when a user has only the paper document, have been developed, in which the image of a paper document is obtained by scanning or capturing by a scanner or digital camera, so that the resulting information is converted into text data by performing character recognition processing on the obtained image.

Japanese Patent Application Laid-Open No. 11-167532 discusses a technique for data processing in which a document image is transmitted from a terminal to a server for character recognition of the image, attribute assignment to the obtained character data, and conversion of the data into a format easy to use, and the resulting data is returned to the terminal. U.S. Pat. No. 6,404,921 and U.S. Patent Publication No. 2005/0238244 discuss a technique for vector data generation based on the outlines of target characters or figures.

Users may require data in different formats for different occasions for reuse of the data. In any occasion, the data is desirably generated as an electronic document (electronic data) in a data format easy to use.

For example, for a user who wants to edit characters in text data expressed in a certain character code after character recognition processing, the resulting data is expected to be arranged in a state the user can easily use. For a user who wants to use the resulting text data for printing as it is, the data after character recognition processing is not convenient for the user because the data may contain false recognition.

U.S. Pat. No. 6,404,921 and U.S. Patent Publication No. 2005/0238244 discuss another technique for rendering a vector object by extracting vector data from a target character. The vector data is suitable for use in printing, but not suitable for edition of text data.

The appropriate data format depends on the purpose for which the data is used by a user, such as edition of character information in text data, printing, and output for display. Accordingly, one electronic document can hardly satisfy multiple purposes simultaneously.

SUMMARY OF THE INVENTION

The present invention is directed to an image forming apparatus, which provides an electronic document (electronic data) that can be represented as character code data or vector data as recognition result of a character area, the character code data and the vector data being easily switchable from each other. This facilitates a selection and use of appropriate data for a certain application by a user.

According to an aspect of the present invention, an image processing apparatus includes an analysis unit configured to analyze an character area and an character color in an input image, a character recognition unit configured to obtain character code data by performing character recognition processing on a character image in the character area, a vectorization unit configured to obtain vector data by performing vectorization processing on a character image in the character area, a color-information definition generation unit configured to generate a plurality of color information definitions that define colors to be used in rendering the character code data and the vector data based on a rule set for each of the plurality of color information definitions and the character color analyzed by the analysis unit, and an electronic document generation unit configured to generate an electronic document containing the character code data obtained by the character recognition unit, the vector data obtained by the vectorization unit, and the plurality of color information definitions generated by the color-information definition generation unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 is a table illustrating an example rule to generate color information definition according to the first exemplary embodiment.

FIG. 6 is a table illustrating example results of analysis and character recognition according to the first exemplary embodiment.

FIG. 7 is a table illustrating example results of color information definition generation according to the first exemplary embodiment.

FIG. 8 illustrates an example of a converted electronic document according to the first exemplary embodiment.

FIG. 11 is an example table illustrating a rule to generate color information definition according to a second exemplary embodiment.

FIG. 13 is a table illustrating example results of analysis and character recognition according to the second exemplary embodiment.

FIG. 14 illustrates a converted electronic document according to the second exemplary embodiment.

FIG. 15 illustrates a converted electronic document according to the second exemplary embodiment.

DESCRIPTION OF THE EMBODIMENTS

Various exemplary embodiments, features, and aspects of the invention will be described in detail below with reference to the drawings.

Figure 1:
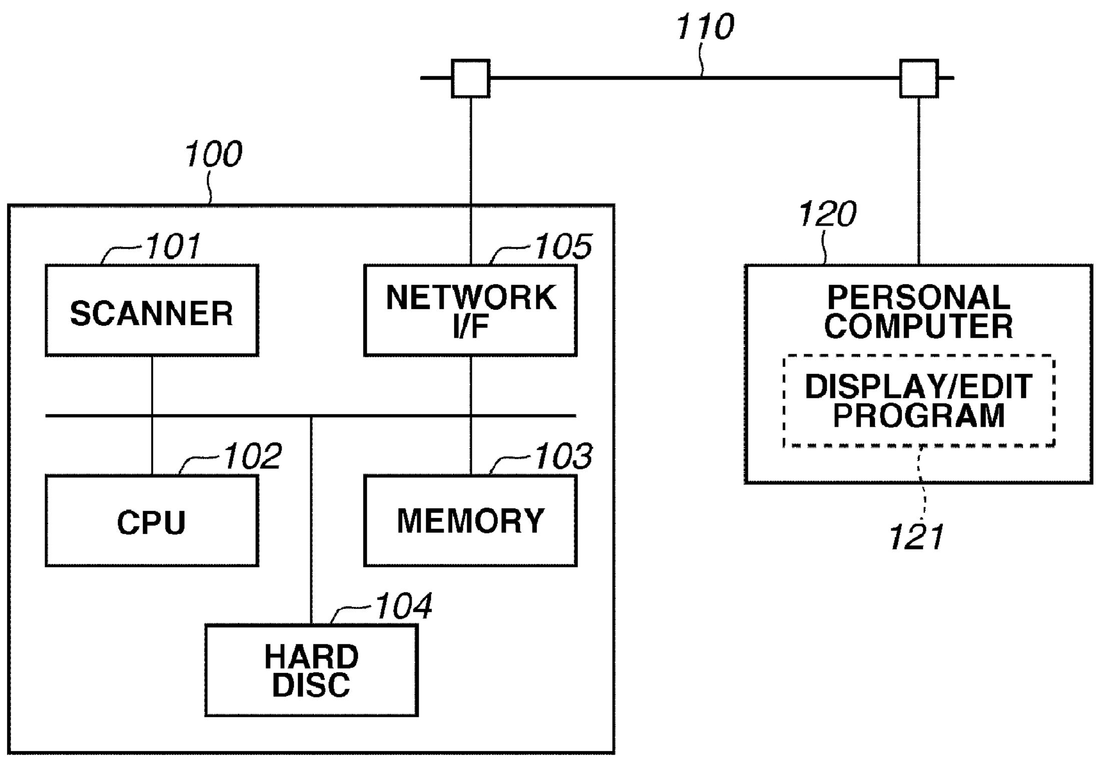
FIG. 1 is a block diagram illustrating a configuration of an image processing system according to an exemplary embodiment of the present invention.

FIG. 1 is a block diagram illustrating a system configuration according to a first exemplary embodiment of the present invention.

An image processing apparatus 100 includes a scanner 101, a central processing unit (CPU) 102, a memory 103, a hard disc 104, and a network I/F 105. The scanner 101 scans a document to convert the information on the paper of the scanned document into image data. The CPU 102 executes a computer-executable electronic document generation program (computer program) of the present invention, and functions as a processing unit configured to perform processing on the image data according to the present invention.

The memory 103 is used as a work memory during execution of the program and to store data temporarily, and the hard disc 104 stores the program and data.

In this exemplary embodiment, the computer program is stored in the hard disc 104, which is called by the CPU as needed for execution. The system configuration is not limited to this.

For example, the computer program may be supplied through another computer-readable storage medium (e.g., CD-ROM and USB memory). The network I/F 105 is an interface for input/output of data to/from an external device through a network.

The personal computer (PC) 120 is connected to the image processing apparatus 100 through a network such as a local area network (LAN) 110, and receives an electronic document transmitted from the image processing apparatus 100. The PC 120 is a general-purpose computer having a CPU, a memory, a hard disc, and a display (not illustrated).

The CPU of the PC 120 executes a display/edition program 121 stored in the hard disc to display the electronic document transmitted from the image processing apparatus 100 for edition.

Figure 2:
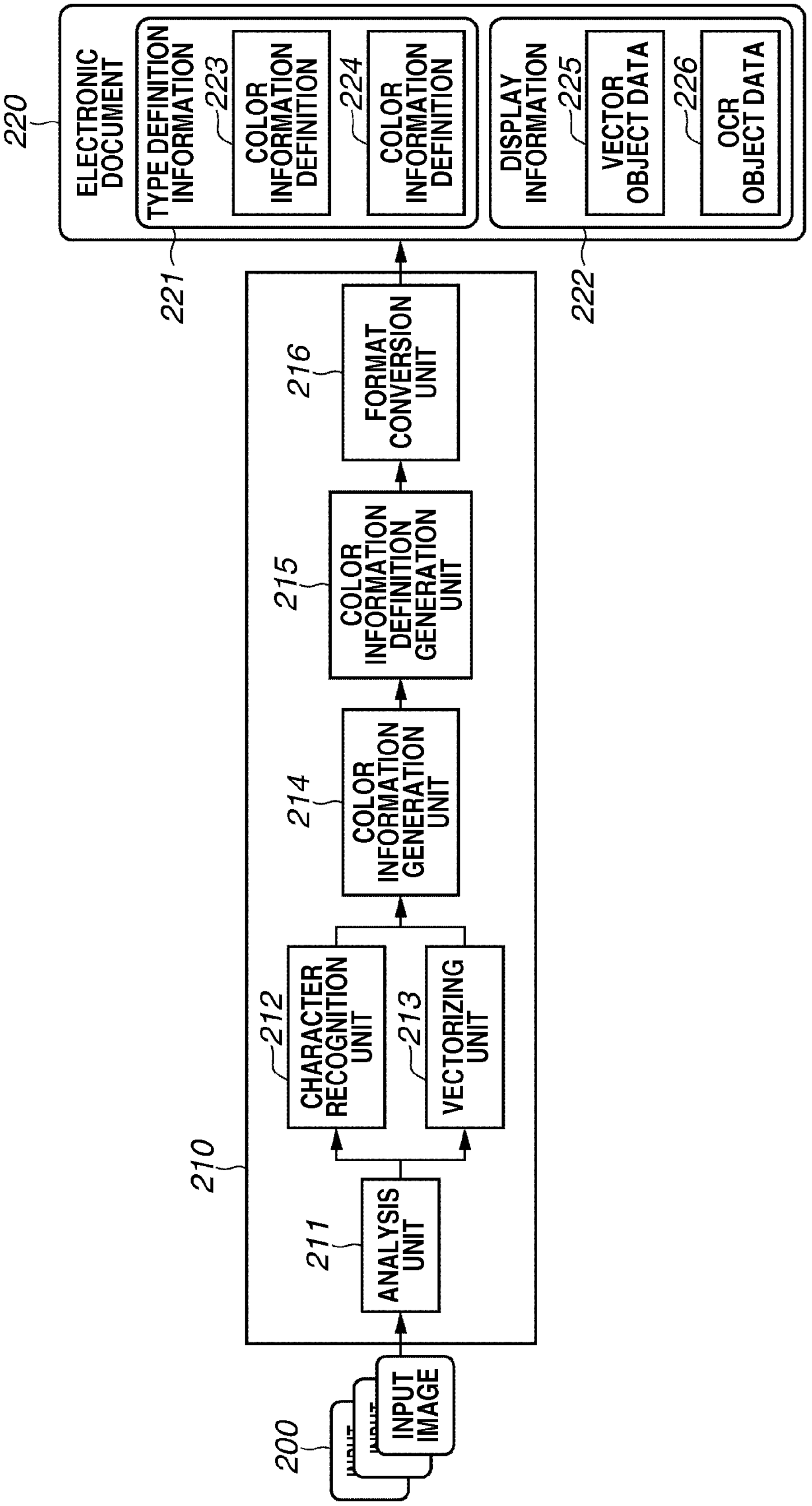
FIG. 2 is a block diagram illustrating operations according to a first exemplary embodiment.

FIG. 2 is a block diagram illustrating operations performed by each unit (processing unit) of the first exemplary embodiment. The processes performed in FIG. 2 are achieved by the execution of an electronic document generation program by the CPU 102, but the present invention is not limited to the configuration, and may be partly or totally configured with an electrical circuit (hardware).

An input image 200 (document image data) is input through the scanner 101 or a camera for example. The electronic document generation unit 210 generates an electronic document 220 from the input image 200. Blocks 211 to 216 schematically illustrate the processing performed in the electronic document generation unit 210.

An analysis unit 211 analyzes the input document image to extract character colors and character areas. The analysis unit 211 performs a known area extraction processing (area split processing), and extracts areas based on the attributes, such as character areas, figure areas, and picture areas.

The analysis unit 211 further extracts a character color (a representative color of characters) from each character area. The color determination may be performed by a known method for determining a representative color of characters. For example, a representative color may be determined by calculating the average of values of similar character colors.

The character recognition unit 212 performs character recognition processing on the character areas extracted by the analysis unit 211 to obtain character code data and generate optical character reader (OCR) object data that is displayed as an OCR result.

The OCR object data contains, other than character code information, the information of position coordinates of the extracted characters and the size information of the characters that are extracted in the character recognition processing. The character recognition unit 212 generates OCR object data containing the character code data by performing character recognition processing.

The vectorizing unit 213 extracts the outline information of each character in the character areas extracted by the analysis unit, and approximates the information using vector data to generate vector object data for vector rendering. The vectorizing unit 213 performs the vectorization processing to generate vector object data (vector data).

The color information generation unit 214 generates a color ID (color information) for the OCR object data output from the character recognition unit 212 and another color ID for the vector object data output from the vectorizing unit 213, and sets the color IDs to be used in an electronic document.

The color information definition generation unit 215 refers to the color IDs generated by the color information generation unit 214 to generate color information definitions 223 and 224 for assigning actual rendering colors to the OCR object data 226 and the vector object data 225, respectively.

The format conversion unit 216 converts the OCR object data 226 and the vector object data 225 each of which is assigned with color information, and the color information definitions 223 and 224 generated by the color information definition generation unit 215 into the format of the electronic document 220.

The format conversion unit 216 functions as an electronic document generation unit configured to generate an electronic document (electronic document file) containing the OCR object data (character code), the vector object data (vector data), and the color information definitions.

The electronic document 220 generated as described above includes type definition information 221 and display information 222, which can be displayed and edited using the display/edition program 121 in the PC 120.

The type definition information 221 is the data that is used to change a type definition using the display/edition program 121, and includes a plurality of color information definitions 223 and 224. The display information 222 is the data used in rendering display information using the display/edition program 121, and includes the vector object data 225 and the OCR object data 226.

Figure 3:
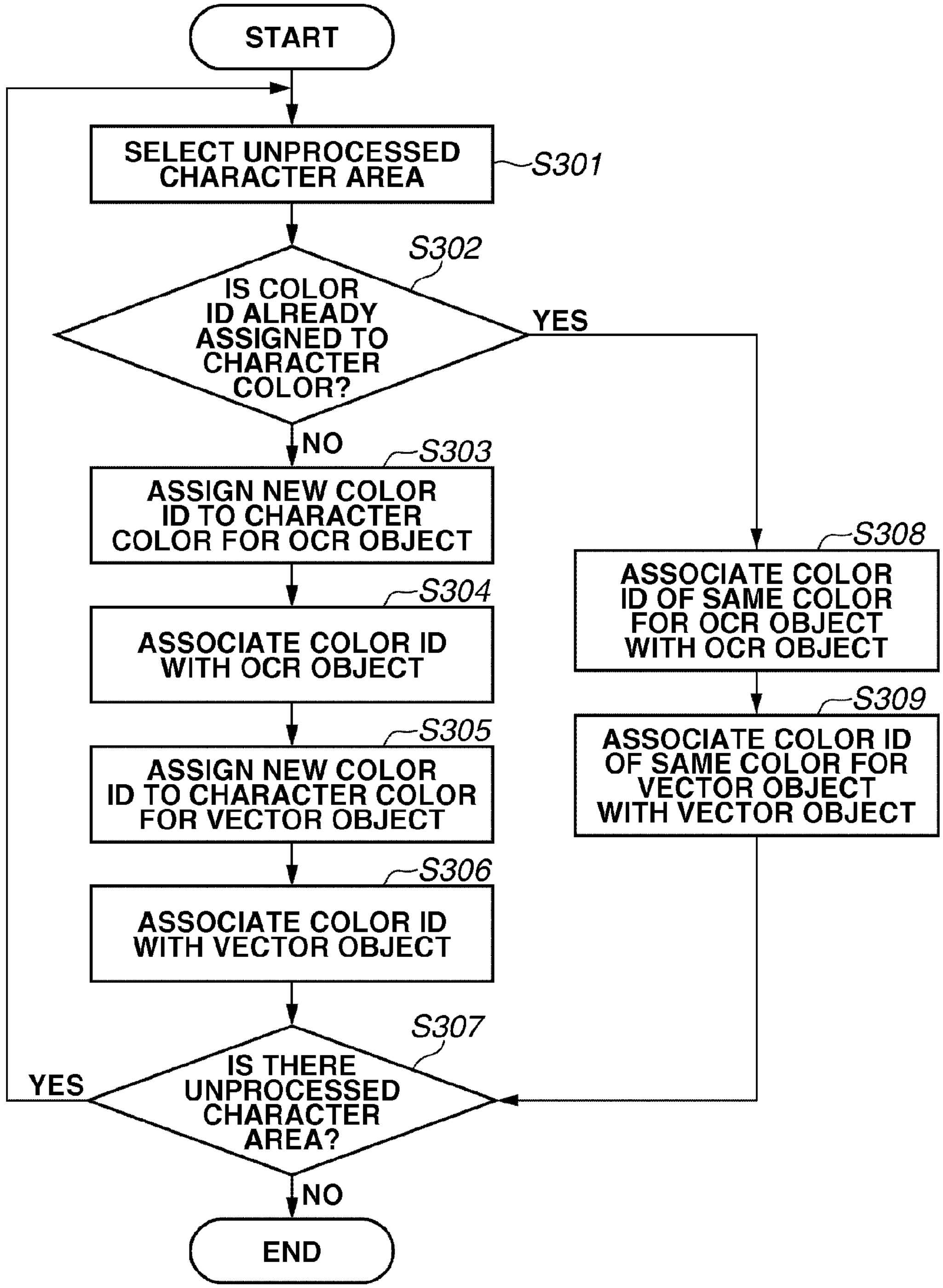
FIG. 3 is a flowchart illustrating a color information generation unit according to the first exemplary embodiment.

With reference to the flowchart of FIG. 3, the processing performed by the color information generation unit 214 is described.

In step S301, the color information generation unit 214 selects an unprocessed area from the character area extracted by the analysis unit 211. In step S302, the color information generation unit 214 determines if the character color of the selected character area is already assigned with a color ID (a color identifier) (i.e., the same color is already processed or not before) or not.

If it is determined that the character color is not assigned with a color ID yet (the same color is not processed yet) (No in step S302), the processing proceeds to step S303. If it is determined that the character color is already assigned with a color ID (the same color is already processed before) (YES in step S302), the processing proceeds to step S308.

In step S303, the color information generation unit 214 assigns a new color ID to the character color for OCR object. The color information generation unit 214 generates a new color ID associated with the character color.

In step S304, the color information generation unit 214 associates the color ID generated in step S303 with the OCR object in the character area as a rendering color.

In step S305, the color information generation unit 214 assigns another new color ID to the character color for vector object data. The color information generation unit 214 generates a new color ID (different from that generated in step S303) associated with the character color.

In step S306, the color information generation unit 214 associates the color ID generated in step S305 with the vector object in the character area as a rending color.

In step S307, the color information generation unit 214 determines if there remains an unprocessed character area among the character areas extracted by the analysis unit 211. If there is an unprocessed character (YES in step S307), the processing returns to step S301 to be repeated. If there is no unprocessed character (NO in step S307), the processing ends.

In step S308, the color information generation unit 214 determines the color ID that is already assigned to the character color of the target character area for OCR object data, and associates the color ID with the OCR object in the target character area. In other words, if there is another OCR object of the same color in the other character area, the same color ID is associated with the OCR object.

In step S309, the color information generation unit 214 determines the color ID that is already assigned to the character color of the target character area for vector object, and associates the color ID with the vector object of the target character area. In other words, if there is another vector object of the same color in the other character area, the same color ID is associated with the vector object.

A case in which the electronic document generation unit 210 processes the image 500 illustrated in FIG. 5 as an example input image 200 is described below.

The analysis unit 211 extracts character areas and character colors from an input image through a known image analysis processing. For example, the analysis unit 211 extracts a group of pixels constituting each of the characters in the image, determines the arrangements of the groups of pixels having similar sizes, and extracts the area of the groups that are determined to form a row or paragraph of characters as a character area.

A group of pixels constituting a character may be extracted using a method for extracting a pixel block having similar colors based on input multi-valued image, or a method based on black pixel blocks in a binary format image that is obtained by binarization of a multi-valued image. Alternatively, a method may be used for the extraction in which a multi-valued image is differentiated to generate an edge image, and a connecting area in edge pixels is extracted.

In the example of the image 500, the areas 501 and 502 surrounded by dotted lines are extracted as character areas that have different character colors from each other.

The character recognition unit 212 uses a known character recognition technique for character recognition in each character area to generate OCR object data composed of character code data and character sizes as a result of the character recognition.

An example of the character recognition processing is described below, which is just an example, and any other method can be used. In this character recognition processing, the directions of writing, that is, horizontal rows or vertical columns in the target character area of an image are determined, and the image is divided by the columns or rows.

For example, an image may be binarized to obtain vertical and horizontal histograms, which are used to determine the direction of writing to divide the image thereinto. Then, each column or row image is divided into character images. The division can by performed by projecting the column or row image vertically and horizontally, so that a gap between characters is found and divided into character images.

The feature of each of the character images is distinguished to retrieve a feature that is most similar to the feature of the character image from the dictionary having features of all characters stored therein in advance. The character code retrieved from the dictionary with the feature is determined to be the recognition result of the character.

The size of a character can be determined as an average value of sizes of character images that are obtained in the character recognition, but may be determined using the other method.

FIG. 6 illustrates the results of the processing by the analysis unit 211 and the character recognition unit 212. The results include character positions, character sizes, character colors, and character strings as a result of the character recognition. As illustrated in FIG. 6, the red-green-blue (RGB) colors "#000000" and "#0000FF" as character color, and character strings "ABC" and "DEF" as a result of the character recognition are extracted from the character areas 501 and 502, respectively.

The vectorizing unit 213 generates vector object data of characters from the image data of each character area using a known vectorization technique. U.S. Pat. No. 6,404,921 and U.S. Patent Publication No. 2005/0238244 discuss vectorization techniques, for example.

For example, U.S. Pat. No. 6,404,921 discusses a vectorization technique. In the technique, vectors between pixels in the horizontal and vertical directions are detected based on the result of raster scan of a target and surrounding pixels in an image. Then the vectors between pixels are used to extract the outline of image data segments to generate information, which is called outline vector, that describes a periphery of a connected pixel data segments using a group of the vectors between pixels.

U.S. Patent Publication No. 2005/0238244 discusses another vectorization technique. In the technique, an outline vector is approximated by a straight line or a two or three dimensional Bezier curve to obtain vector description data that maintains high quality even after significantly magnified.

The processing performed by the color information generation unit 214 onto the image 500 is described below with reference to the flowchart of FIG. 3.

In step S301, the color information generation unit 214 selects the character area 501 as an unprocessed character area. In step S302, because there is no character color that is already processed (NO in step S302) (there is no character color having an assigned color ID), the processing proceeds to step S303. In step S303, the color information generation unit 214 generates a new color ID "clr1" for OCR object, and associates the color ID with the character color (RGB color "#000000") obtained from the character area 501.

In step S304, the color information generation unit 214 sets the color ID generated in step S303 as a rendering color for the OCR object obtained from the character area 501. In step S305, the color information generation unit 214 generates a new color ID “clr3” for vector object, and associates the color ID with the character color (RGB color “#000000”) obtained from the character area 501.

In step S306, the color information generation unit 214 sets the color ID generated in step S305 as a rendering color for the vector object obtained from the character area 501. Because the character area 502 is not processed yet (YES in step S307), the proceeds returns to step S301, and targets the character area 502 for the processing.

In step S302, the color information generation unit 214 determines if the character color of the character area 502 is already assigned with a color ID or not. In other words, the color information generation unit 214 checks if there is any color ID associated with the character color “#0000FF” of the character area 502. In FIG. 5, because the character color of the character area 502 is not assigned with a color ID yet (NO in step S302), the processing proceeds to step S303.

In step S303, the color information generation unit 214 generates a new color ID “clr2” for OCR object, and associates the color ID with the character color (RGB color “#0000FF”) obtained from the character area 502. The color information generation unit 214 sets the color ID as a rendering color for the OCR object obtained from the character area 502 in step S304.

In step S305, the color information generation unit 214 generates a new color ID “clr4” for vector object, and associates the color ID with the character color (RGB color “#0000FF”) obtained from the character area 502. The color information generation unit 214 sets the color ID as a rendering color for the vector object obtained from the character area 502 in step S306.

In step S307, the processing for all of the character areas has been completed (NO in step S307), and the processing ends.

The color IDs are called “clr1”, “clr2”, “clr3”, and “clr4” for convenience in the above example, but may be called in different manner. Depending on a format used, such as OfficeOpenXML, color IDs (color information) may be assigned to colors in advance. In this case, the specified color IDs are supposed to be used.

Referring to FIG. 2 again, the color information definition generation unit 215 generates a plurality of color information definitions (color set) based on the rule that is defined in advance (rule for generating color information definition) such as that illustrated in FIG. 4. In the present exemplary embodiment, two color sets (two themes) are determined.

In the present exemplary embodiment, in the rule for generating color information definition, the data type that is rendered in a character color and the data type that is rendered in a transparent color are set, for each color information definition. In other words, in the generation rule, whether the normal character color or the transparent color is used is set in rendering each of the OCR object (character code) and the vector object (vector data), for each color information definition.

According to the rule in FIG. 4, first, the alpha channel is set to be 100% for the color IDs “clr1” and “clr2” for OCR object, while the alpha channel is set to be 0% (i.e., transparent color) for the color IDs “clr3” and “clr4” for vector object, as a first color information definition (the color information definition: “OCR DISPLAY”).

Next, a theme is generated in which the alpha channel is set to be 0% for the color IDs “clr1” and “clr2” for OCR object, while the alpha channel is set to be 100% for the color IDs “clr3” and “clr4” for vector object, as a second color information definition (the color information definition: “OUTLINE DISPLAY”).

In this way, two types of color information definitions (two color sets) are generated. FIG. 7 illustrates the resulting color information definitions.

In FIG. 7, the original character colors are applied to all of the color information, but the color with the alpha channel of 0% is rendered transparent, and thereby the information may have an RGB value other than the character color.

The format conversion unit 216 generates an electronic document 220 including the two types of color information definitions 223 and 224 generated by the color information definition generation unit 215 as well as the OCR object data 226 and the vector object data 225.

In the electronic document 220, the OCR object data 226 generated by the character recognition unit 212 and the vector object data 225 generated by the vectorizing unit 213 are described to be rendered using the color IDs associated with respectively by the color information generation unit 214.

With the two types of color information definitions (color sets) 223 and 224, the display/edition program 121 can switch the color information definitions from each other to display OCR object data or vector object data.

An electronic document 800 in FIG. 8 is an example of the electronic document 220 according to a virtual XML format for illustration of the present exemplary embodiment.

The portion 801 between the element names <DefineStyle> and </DefineStyle> contains the type-definition information 221 of the electronic document. The portion 801 contains two color information definitions 803 and 804. In FIG. 8, the color information definition 804 (“Vector Display”) is selected with the attribute “default” being true in the element <ColorSet>, as the color set on the initial display.

The portion 802 between the element names <Layout> and </Layout> contains the display information of the electronic document. The portion 802 contains the OCR object data 805 for rendering the text of an OCR result and the vector object data 806 for rendering a vectorization result.

The OCR object data 805 are associated with the color IDs “clr1” and “clr2”. Accordingly, when the color information definition 803 is selected, the rendering is performed in the character color, and when the color information definition 804 is selected, the rendering is performed in transparent.

The vector object data 806 are associated with the color IDs “clr3” and “clr4”. Accordingly, when the color information definition 803 is selected, the rendering is performed in transparent, and when the color information definition 804 is selected, the rendering is performed in the character color.

The element names and tree structures in the electronic document 220 are generated according to the specification of the display/edition program 121. Depending on the type of the display/edition program 121, element names and tree structures other than those illustrated in FIG. 8 may be output.

Figure 5:
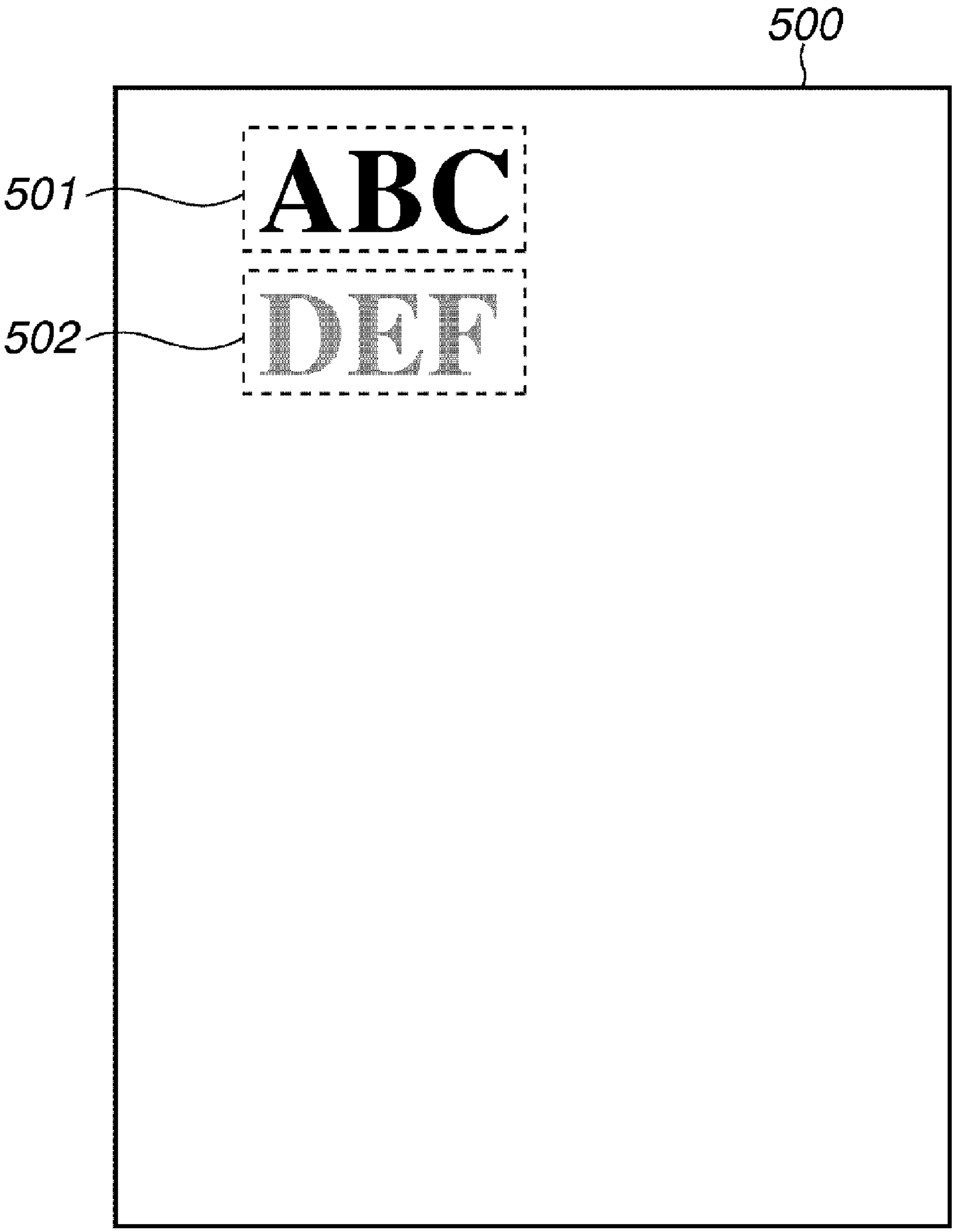
FIG. 5 illustrates an example input image according to the first exemplary embodiment.

Next, an example is described below in which the electronic document 800 in FIG. 8 generated from the image 500 in FIG. 5 is processed using the display/edition program 121 executed by the personal computer 120 in FIG. 1.

Figure 9:
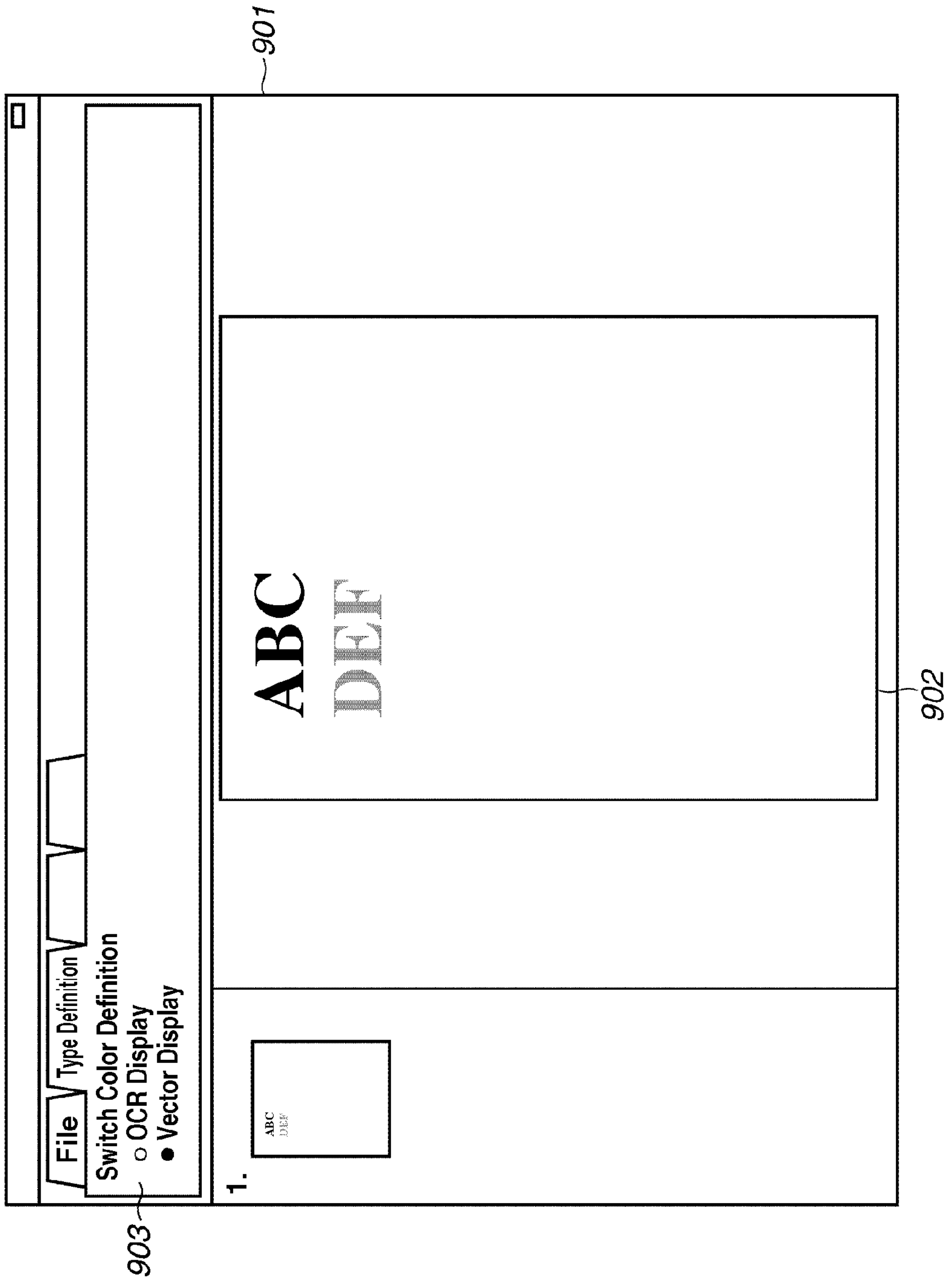
FIG. 9 illustrates an example electronic document displayed using a display/edition program according to the first exemplary embodiment.

FIG. 9 is an example display of the electronic document 800 input into the display/edition program 121.

The display/edition program 121 displays a display window 901, an edition window 902, and a color definition switch menu window 903. The edition window 902 displays the contents of the display information 222 in the electronic document 220. When the electronic document 800 in FIG. 8 is displayed, the contents of the OCR object data (text rendering data) 805 or vector object data (vector rendering data) 806 are rendered.

A user can use the edition window 902 for vectoring editions such as scaling of vector object and change in color information, and text editions such as edition of character string in text object, change in font size and type, and change in color information. A user also can store the edited electronic document, and prints out the contents on paper as displayed in the window 902.

For the electronic document 800 in FIG. 8, the color information definition has a default value of the color information definition name “Vector Display” 804. Accordingly, in the initial display, the alpha channel is set to be 0% for “clr1” and “clr2”, and 100% for “clr3” and “clr4”, and thereby a vector object is rendered in the set character color on the edition window. Thus, a user can easily edit the vector object.

The color definition switch menu window 903 is provided with a menu (radio buttons) that allows a user to switch the color information definitions 223 and 224 from each other according to the type-definition information 221 in the electronic document 220. An instruction for switching input from a user causes the displayed contents to be switched, which updates the contents displayed on the edition window 902.

The two color information definitions of “OCR Display” and “Vector Display” in FIG. 8 appear as the switch buttons for the two color information definitions on the window 903 in FIG. 9.

When a user switches the color information to “OCR Display” through the color definition switch menu window 903, the color information definition 803 in the electronic document 800 is applied and the alpha channel is set to be 100% for “clr1” and “clr2”, and 0% for “clr3” and “clr4”. As a result, the vector object becomes transparent, and an OCR object is rendered in the set character color on the edition window.

In FIG. 9, the color definition is switched using the menu 903 displayed on the display window 901, but may be switched using other method.

Figure 10:
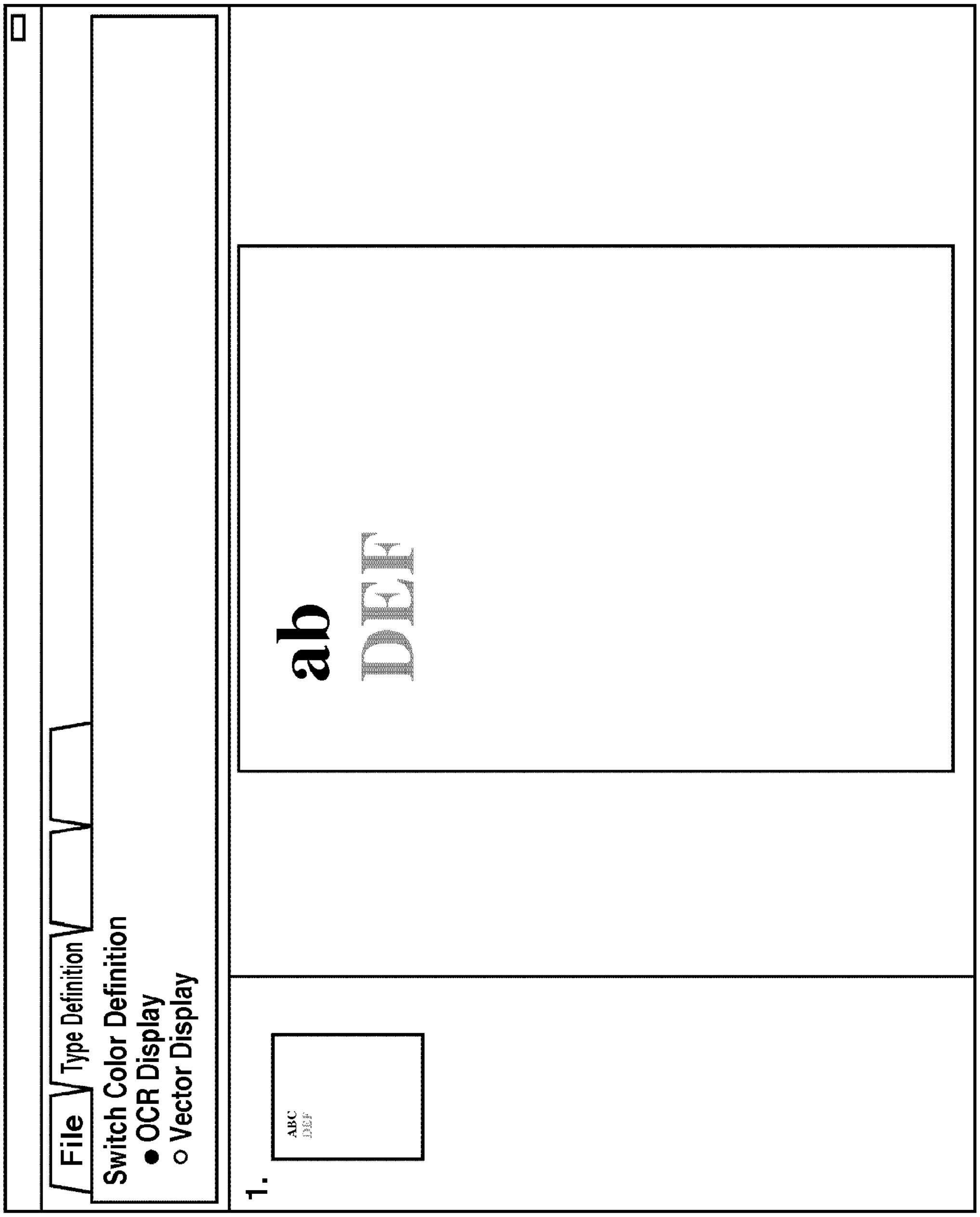
FIG. 10 illustrates an example electronic document displayed using a display/edition program in another color information definition according to the first exemplary embodiment.

FIG. 10 is an example display when a user switches the color definition to “OCR Display”, and edits the character string “ABC” to “ab”. In “OCR Display”, the text data can be easily changed using a keyboard. In addition, the text data can be copied as a result of OCR, to be used in other application.

In FIG. 8, the original character images are all recognized correctly by the character recognition processing. The images, however, may be recognized incorrectly. In the latter case, the display in the “OCR Display” is apparently different from the original input image. For the printing and display of the image that is apparently the same as the original, a user can switch the definition into “Vector Display”. Since the switching between vector display and OCR display is easy, incorrect character strings as a result of OCR can be easily corrected.

The switching between color information definitions can be performed through a user interface (menu), which facilitates the uses of data for different purposes. For example, a user can select “Vector Display” to print out the scanned document as it is, or use the document for presentation, whereas can select “OCR Display” to edit and use the words in the scanned document as a text data.

As described above, in the present exemplary embodiment, vectorized information (vector data) and information processed for character recognition (character code) are obtained from the same character area in an image, and are assigned with different color IDs. A plurality of color information definitions are individually used to change the color IDs for transparency. Consequently, an electronic document containing the vector data, the character code, the color IDs for the data and code, and the plurality of color information definitions are created.

The Plurality of color information definitions are individually used to change the color IDs for transparency. This enables the switching and display of vectorized information (vector data) and information processed for character recognition (character code) by a simple operation for selection.

The electronic data created as described above can be switched and used by a user through the menu on the display/edition program 121.

The present exemplary embodiment can provide an electronic document in which both of character code data and vector data can be obtained from a character area as a recognition result, and the two data can be easily switched for display from each other for different purposes by a user.

The display/edition program 121 may be, for example, an application for presentation such as PowerPoint 2007 (trademark) from Microsoft Corporation. When PowerPoint 2007 is used, the format conversion unit 216 converts the color set for “OCR Display” and the color set for “Vector Display” illustrated in FIG. 7 so that they are set to be a color pattern according to a theme of PowerPoint 2007 to create an electronic document.

According to the present exemplary embodiment, using a commercially available application such as PowerPoint 2007, an electronic document can be created in which the text data of the document as a result of OCR and vector data generated from the outlines of characters in the document can be easily switched from each other for display.

The display/edition program 121 is not limited to PowerPoint 2007, and may be any application with a user interface that enables the switching of color information definitions such as the color definition switch menu window 903.

In the first exemplary embodiment, two color information definitions are simply switched, but more color information definitions may be generated for different purposes.

Figure 17:
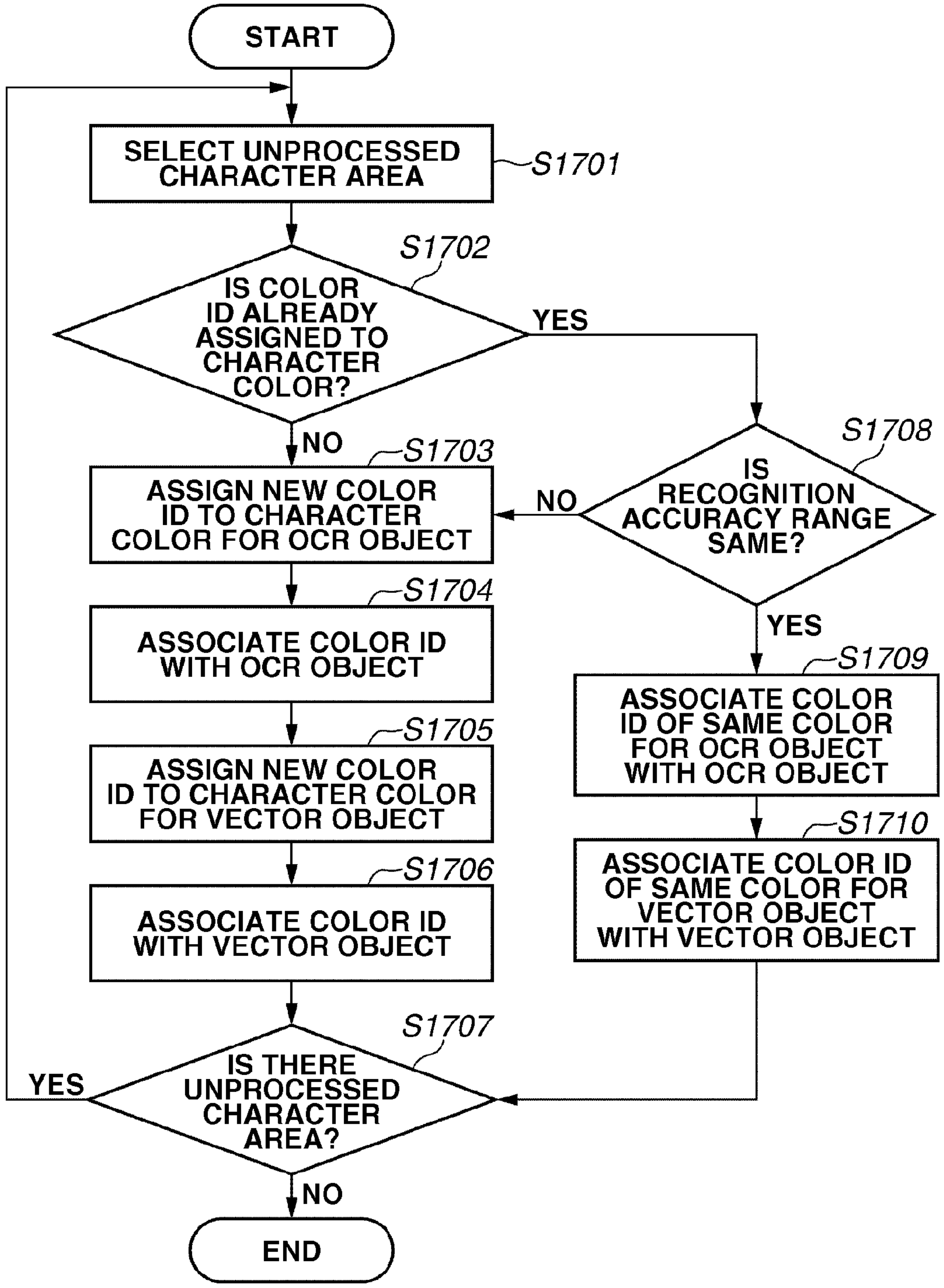
FIG. 17 is a flowchart illustrating a color information generation unit according to the second exemplary embodiment.

An example in which the table contents in FIG. 11 is applied as a color information definition generation rule is described below. In FIG. 11, four color information definitions are set. FIG. 17 is a flowchart illustrating the operations performed by the color information generation unit 214 according to a second exemplary embodiment.

In step S1701, the color information generation unit 214 selects an unprocessed area from the character areas extracted by the analysis unit 211.

In step S1702, the color information generation unit 214 determines if the character color of the selected character area is already assigned with a color ID (color identifier) or not (i.e., determines if the same character color is processed before or not).

It is determined that the character color is not assigned with a color ID yet (i.e., the same character color is not processed before) (NO in step S1702), the processing proceeds to step S1703. Otherwise (YES in S1702), the processing proceeds to step S1708.

In step S1703, the color information generation unit 214 assigns a new color ID to the character color for OCR object. The color information generation unit 214 generates a new color ID associated with the character color. In step S1704, the color information generation unit 214 associates the color ID generated in step S1703 with the OCR object of the character area as a rendering color thereof.

In step S1705, the color information generation unit 214 assigns a new color ID to the character color for vector object. The color information generation unit 214 generates a new color ID (different from the color ID generated in step S303) associated with the character color. In step S1706, the color information generation unit 214 associates the color ID generated in step S1705 with the vector object of the character area as a rendering color therefor.

In step S1707, the color information generation unit 214 determines if there remains an unprocessed character area in the character areas extracted by the analysis unit 211 or not. If there remains an unprocessed character area (YES in step S1707), the processing returns to step S1701 to be repeated. If there remains no unprocessed character area (NO in step S1707), the processing ends.

In step S1708, the color information generation unit 214 determines if the recognition accuracy of the character area is within the range of recognition accuracy of the character area to which the color ID is associated, both area having the color ID for the same color as determined in step S1702. In the present exemplary embodiment, the ranges of recognition accuracy (character similarity) are classified into three: high accuracy (90% or more), middle accuracy (from 70% to less than 90%) and low accuracy (less than 70%).

If the color information generation unit 214 determines that the accuracy is within the range of the recognition accuracy (YES in step S1708), the processing proceeds to step S1709. If the color information generation unit 214 determines that the accuracy is not within the range of the recognition accuracy (NO in step S1708), the processing proceeds to step S1703.

In step S1709, the color information generation unit 214 determines the color ID that is already assigned for OCR object based on the character color and the recognition accuracy obtained from the target character area, and associates the determined color ID to the OCR object of the target character area. If there is an OCR object having the same color and the same accuracy in other character areas, the same color ID is associated with the object.

In step S1710, the color information generation unit 214 determines the color ID that is already assigned for vector object based on the character color and the recognition accuracy obtained from the target character area, and associates the determined color ID to the vector object of the target character area. If there is a vector object having the same color and the same accuracy in other character areas, the same color ID is associated with the object.

A case in which the electronic document generation unit 210 processes the image 1200 as an example of the input image 200 is described below.

The analysis unit 211 extracts character areas in the input image. The areas surrounded by the dotted lines 1201 to 1204 are extracted from the image 1200, each of the area having different character colors.

The character recognition unit 212 performs character recognition processing on each character area to obtain character code data as a result of the character recognition, and a recognition accuracy value (similarity) that indicates the rate of the character recognition.

In the present exemplary embodiment, the recognition accuracy value is obtained and determined by averaging the similarities of characters obtained by the character recognition in each character area. The method for determining recognition accuracy is not limited to this.

In the present exemplary embodiment, a plurality of characters are considered as one character area. The characters, however, may be considered in different manner, and one character may be considered as a character area.

FIG. 13 illustrates the character areas extracted from the image 1200 and the results of character recognition for each area. For the character area 1201, the character recognition unit 212 obtains the character color "#000000" and "ABC" as a result of character recognition, and "High" for recognition accuracy. For the character area 1202, the character recognition unit 212 obtains the character color "#0000FF" and "DFE" as a result of character recognition, and "Middle" for recognition accuracy.

For the character area 1203, the character recognition unit 212 obtains the character color "#000000" and "UVVV" as a result of character recognition, and "Low" for recognition accuracy. For the character area 1204, the character recognition unit 212 obtains the character color "#FF0000" and "XYZ" as a result of character recognition, and "High" for recognition accuracy.

The vectorizing unit 213 generates vector rendering data of characters from the image data of each character area using a known vectorization technique.

The processing performed by the color information generation unit 214 onto the image 1200 is described below with reference to the flowchart of FIG. 17.

In step S1701, the color information generation unit 214 selects the character area 1201 as an unprocessed character area. In step S1702, because there is no character color that is already processed (there is no character color having an assigned color ID) (NO in step S1702), the processing proceeds to step S1703. In step S1703, the color information generation unit 214 generates a new color ID "clr1" for OCR object, and associates the color ID with the character color (RGB color "#000000") obtained from the character area 1201.

In step S1704, the color information generation unit 214 sets the color ID generated in step S1703 as a rendering color for the OCR object obtained from the character area 1201. In step S1705, the color information generation unit 214 generates a new color ID "clr5" for vector object, and associates the color ID with the character color (RGB color "#000000") obtained from the character area 1201.

In step S1706, the color information generation unit 214 sets the color ID generated in step S1705 as a rendering color for the vector object obtained from the character area 1201. In step S1707, because there is an unprocessed character area 1202 (YES in step S1707), the proceeds returns to step S1701, and targets the character area 1202 for the processing.

In step S1702, the color information generation unit 214 determines if a color ID is already assigned to the character color of the character area 1202 or not. In other words, the color information generation unit 214 checks if there is any color ID associated with the character color "#0000FF" of the character area 1202.

Figure 12:
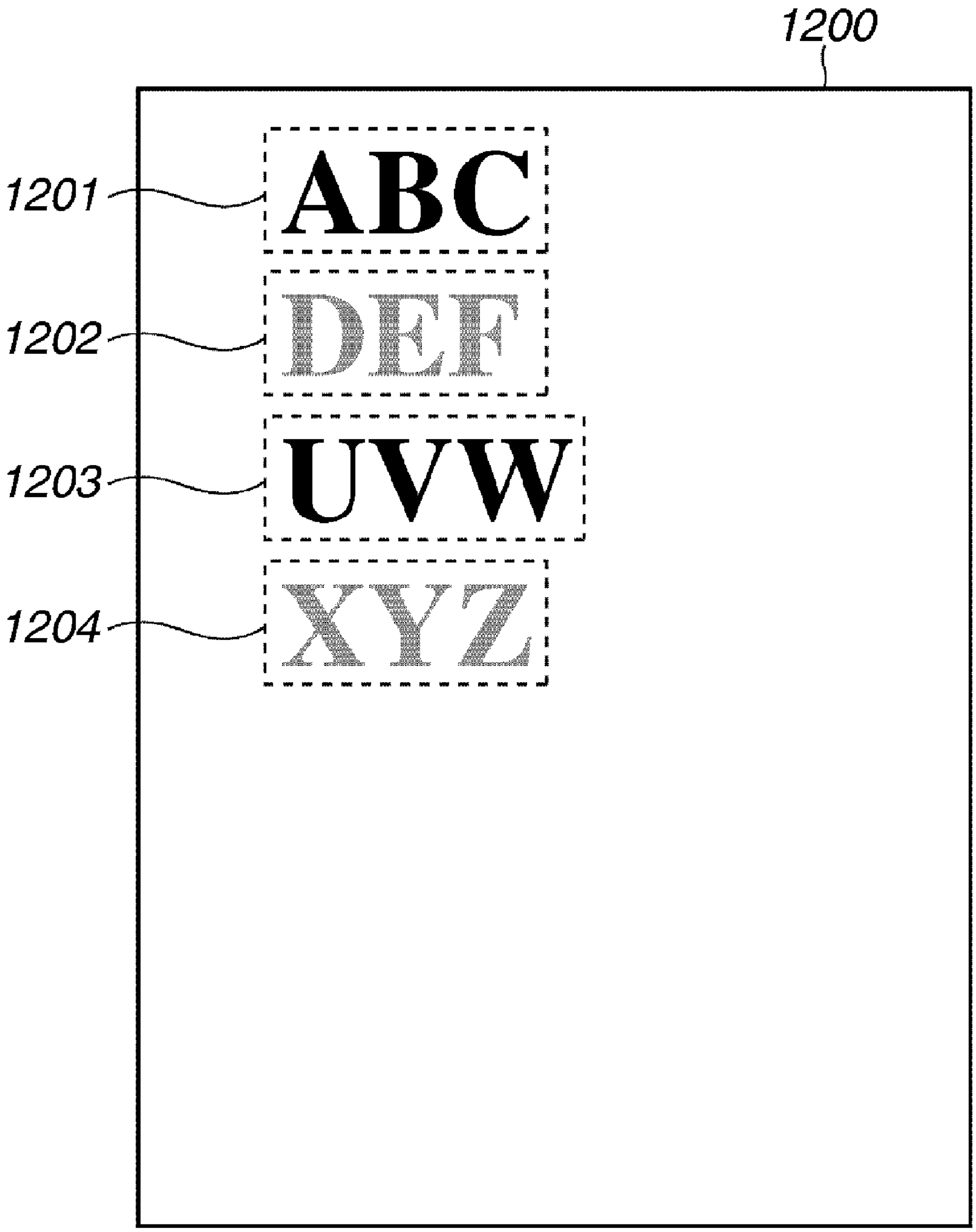
FIG. 12 illustrates an example input image according to the second exemplary embodiment.

In FIG. 12, because no color ID is assigned to the character color "#0000FF" of the character area 1202 yet (NO in step S1702), the processing proceeds to step S1703.

In step S1703, the color information generation unit 214 generates a new color ID "clr2" for OCR object, and associates the color ID with the character color (RGB color "#0000FF") obtained from the character area 1202. The color information generation unit 214 sets the color ID as a rendering color for the OCR object obtained from the character area 1202 in step S1704.

In step S1705, the color information generation unit 214 generates a new color ID "clr6" for vector object, and associates the color ID with the character color (RGB color "#0000FF") obtained from the character area 1202. The color information generation unit 214 sets the color ID as a rendering color for the vector object obtained from the character area 1202 in step S1706.

In step S1707, because there is an unprocessed character area 1203 (YES in step S1707), the processing returns to step S1701, and targets the character area 1203 for the processing.

In step S1702, the color information generation unit 214 determines if a color ID is assigned to the character color of the character area 1203 or not. In other words, the color information generation unit 214 determines if there is a color ID associated with the character color “#000000” of the character area 1203.

In FIG. 12, there are the color IDs “clr1” and “clr5” for the character color “#000000” of the character area 1203 (YES in step S1702), the processing proceeds to step S1708.

In step S1708, the color information generation unit 214 determines if the recognition accuracy obtained from the character area 1203 falls in the range of the recognition accuracy of the character area 1201 having the color IDs “clr1” and “clr5” assigned thereto in step S1702 or not. In other words, the color information generation unit 214 determines if the range of the character recognition accuracy in the character area 1203 coincides with the range of the recognition accuracy in the character area 1201 or not.

If the recognition accuracy of the character area 1201 is “High” and the recognition accuracy of the character area 1203 is “Low” (NO in step S1708), the processing proceeds to step S1703.

In step S1703, the color information generation unit 214 generates a new color ID “clr3” for OCR object, and associates the color ID with the character color (RGB color “#000000”) obtained from the character area 1203. The color information generation unit 214 sets the color ID as a rendering color for the OCR object obtained from the character area 1203 in step S1704.

In step S1705, the color information generation unit 214 generates a new color ID “clr7” for vector object, and associates the color ID with the character color (RGB color “#000000”) obtained from the character area 1203. The color information generation unit 214 sets the color ID as a rendering color for the vector object obtained from the character area 1203 in step S1706.

In step S1707, because there is an unprocessed character area 1204 (YES in step S1707), the processing returns to step S1701, and targets the character area 1204 for the processing.

In step S1702, the color information generation unit 214 determines if a color ID is assigned to the character color of the character area 1204 or not. In other words, the color information generation unit 214 determines if there is a color ID associated with the character color “#FF0000” of the character area 1204. In FIG. 12, a color ID is not assigned to the character color “#FF0000” of the character are 1204 yet (NO in step S1702), the processing proceeds to step S1703.

In step S1703, the color information generation unit 214 generates a new color ID “clr4” for OCR object, and associates the color ID with the character color (RGB color “#FF0000”) obtained from the character area 1204. The color information generation unit 214 sets the color ID as a rendering color for the OCR object obtained from the character area 1204 in step S1704.

In step S1705, the color information generation unit 214 generates a new color ID “clr8” for vector object, and associates the color ID with the character color (RGB color “#FF0000”) obtained from the character area 1204. The color information generation unit 214 sets the color ID as a rendering color for the vector object obtained from the character area 1204 in step S1706.

In step S1707, the processing for all of the character areas has been completed (NO in step S1707), and the processing ends.

The color IDs are called “clr1” to “clr8” for convenience in the above example, but may be called in different manner. Depending on a format used, such as OfficeOpenXML, color IDs (color information) may be assigned to colors in advance. In this case, the specified color IDs are supposed to be used.

Next, the color information definition generation unit 215 generates, as illustrated in FIG. 11, a plurality of color information definitions (color set) based on the rule that is defined in advance (rule for generating color information definition).

In the present exemplary embodiment, four color sets (four themes) are determined. In the present exemplary embodiment, in the rule for generating color information definition, the data type that is rendered in a character color and the data type that is rendered in a transparent color, for each color information definition, are set.

In other words, in the generation rule, the normal character color or the transparent color to be used in rendering for each color information definition are set, based on an OCR object (character code), its recognition accuracy, and a vector object (vector data).

FIG. 14 illustrates the resulting color information definitions according to the rule illustrated in FIG. 11 and the character recognition in FIG. 13.

The alpha channel is set to be 100% for the color IDs “clr1” to “clr4” for OCR object, while the alpha channel is set to be 0% (i.e., transparent color) for the color IDs “clr5” to “clr8” for vector object, for a first color information definition (the color information definition names: “ALL OCR DISPLAY”).

The alpha channel is set to be 100% for the color IDs for OCR object having the recognition accuracy of more than “Middle” (i.e., “clr1”, “clr2” and “clr4”), and the color IDs for vector object having the recognition accuracy of less than “Middle” (i.e., “clr7”), for a second color information definition (OCR display having more than middle accuracy). The alpha channel is set to be 0% for the other color IDs (i.e., “clr3”, “clr5”, “clr6” and “clr8”).

For a third color information definition (OCR display having high accuracy), the alpha channel is set to be 100% for the color IDs for OCR object having the recognition accuracy of more than “High” (i.e., “clr1” and “clr4”). The alpha channel is set to be 100% for the color IDs for vector object having the recognition accuracy of less than “High” (i.e., “clr6” and “clr7”). The alpha channel is set to be 0% for the other color IDs (i.e., “clr2”, “clr3”, “clr5” and “clr8”).

For a fourth color information definition (ALL vector display), the alpha channel is set to be 100% for the color IDs “clr5” to “clr8” for vector object, while 0% for the color IDs “clr1” to “clr4” for OCR object.

The format conversion unit 216 generates an electronic document that contains the four types of color information definitions generated by the color information definition generation unit 215 as well as the OCR object data and the vector object data.

In the electronic document, the OCR object data generated by the character recognition unit 212 and the vector object data generated by the vectorizing unit 213 are described to be rendered using the color IDs associated with respectively by the color information generation unit 214.

With the four types of the color information definitions (color sets) are contained, the display/edition program 121 can switch the color information definitions from one another to display OCR object data or vector object data in an appropriate manner for different purposes.

An electronic document 1500 in FIG. 15 is an example of the electronic document created according to a virtual XML format for illustration of this exemplary embodiment.

The portion 1501 between the element name <DefineStyle> and </DefineStyle> contains the type-definition information 221 of the electronic document. The portion 1501 contains four color information definitions 1503,1504, 1505, and 1506 (only a part of the definitions is illustrated in FIG. 15 due to the space limitations).

In FIG. 15, the color information definition 1506 ("All Vector Display") is selected with the attribute "default" being true in the element <ColorSet>, as the color set used for the initial display.

The portion 1502 between the element names <Layout> and </Layout> contains the display information for the electronic document. The portion 1502 contains the OCR object data 1507 for rendering the text of an OCR result and the vector object data (vector rendering information) 1508 for rendering a vectorization result.

The element names and tree structures in the electronic document are generated according to the specification of the display/edition program 121. Depending on the type of the display/edition program 121, element names and tree structures other than those illustrated in FIG. 15 may be output.

Next, an example is described below in which the electronic document 1500 in FIG. 15 generated from the image 1200 in FIG. 12 is processed using the display/edition program 121 executed by the personal computer 120 in FIG. 1.

Figure 16:
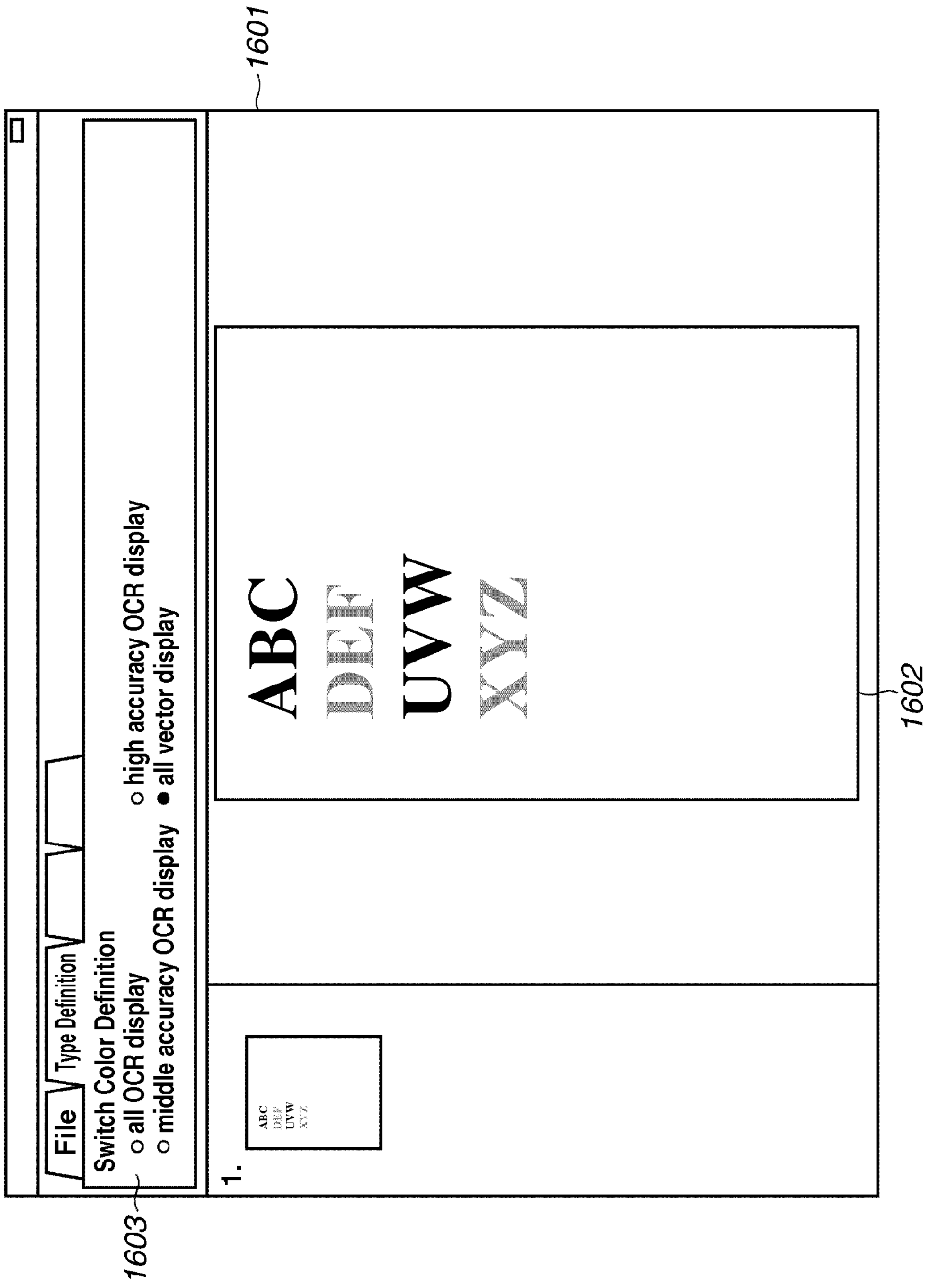
FIG. 16 illustrates an electronic document displayed in a display/edition program according to the second exemplary embodiment.

FIG. 16 is an example display of the electronic document 1500 input into the display/edition program 121. The display/edition program 121 displays a display window 1601 that includes an edition window 1602 and a color definition switch menu window 1603.

The edition window 1602 displays the contents according to the display information in the electronic document. When the electronic document 1500 in FIG. 15 is displayed, the contents of the OCR object data (text rendering data) 1507 or vector object data (vector rendering data) 1508 are rendered.

A user can use the edition window 1602 for vectoring editions such as scaling of vector object and change in color information, and text editions such as edition of character string in text object, change in font size and type, and change in color information. A user also can store the edited electronic document, and prints out the contents on paper as displayed in the window 1602.

For the electronic document 1500 in FIG. 15, the color information definition has a default value of the color information definition name "ALL OCR DISPLAY" 1506. Accordingly, in the initial display, the alpha channel is set to be 0% for "clr1" to "clr4", and 100% for "clr5" to "clr8", and thereby a vector object is rendered in the set character color on the edition window. Thus, a user can easily edit the vector object.

The color definition switch menu window 1603 is provided with a menu (radio buttons) that allows a user to switch the color information definitions according to the type-definition information in the electronic document. An instruction for switching from a user causes the displayed contents to be switched, which updates the contents displayed on the edition window 1602.

Since the four color information definitions of "ALL OCR DISPLAY" "MIDDLE ACCURACY OCR DISPLAY" "HIGH ACCURACY OCR DISPLAY" and "ALL VECTOR DISPLAY" are set for the electronic document 1500 in FIG. 15, the four switch buttons for switching the four types of four color information definitions are displayed in the window 1603 in FIG. 16.

When a user switches the color information to "ALL OCR Display" through the color definition switch menu window 1603, the color information definition 1503 in the electronic document 1500 is applied and the alpha channel is set to be 100% for "clr1" to "clr4", and 0% for "clr5" to "clr8".

As a result, the OCR object is rendered in the set character color on the edition window. Thus, a user can easily edit the OCR object.

Figure 18:
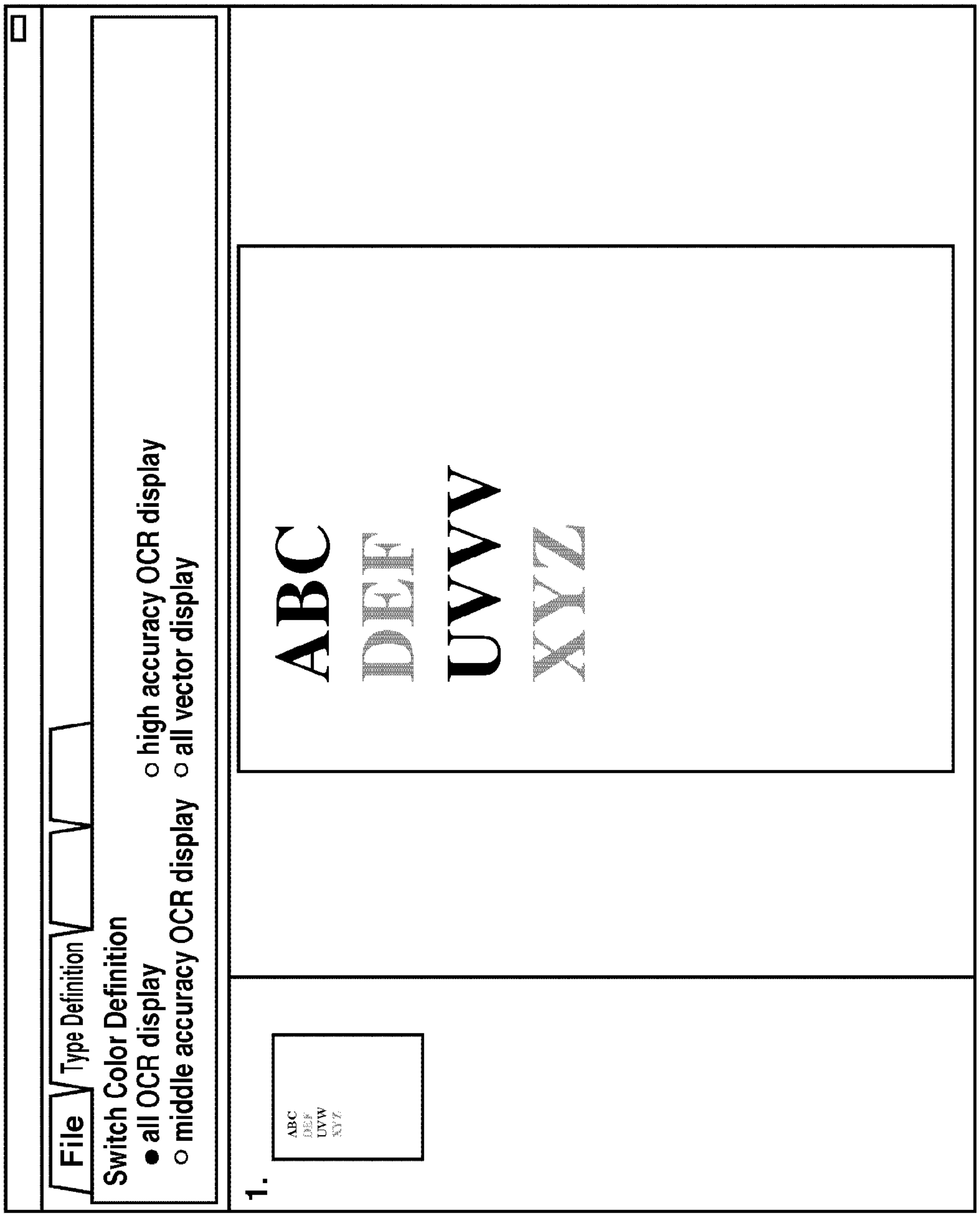
FIG. 18 illustrates an example electronic document displayed in another color information definition by using a display/edition program according to the second exemplary embodiment.

As in the character area 1203 in FIG. 13, the original character images may be recognized incorrectly. In this case, the application of the color information definition "ALL OCR DISPLAY" generates a display apparently different from the original input image as illustrated in FIG. 18. For the printing and display of the image that is apparently the same as the original, a user can switch the definition into "Vector Display".

The selection of "HIGH ACCURACY OCR DISPLAY" generates characters having high recognition accuracy (similarity) based on the text obtained as a result of OCR, and character images having low recognition accuracy based on vector data. Since the switching between vector display and OCR display is easy, incorrect character strings obtained as a result of OCR can be easily corrected.

When a user wants to edit a part of a character area, for a character area having low character recognition accuracy, the subdivided color information definitions enables the edition of the part of the character by a user using a vector display while maintaining the information as it seems.

In the present exemplary embodiment, the rule for color information definition is created based on the recognition accuracy as the reference, but other reference may be used. For example, a color information definition may be created in which a character string lying at an upper portion of a document and exceeds a threshold is determined as a title, and applies different rules on the title and the body of the document.

As described above, according to the present exemplary embodiment, vectorized information and information as a result of character recognition are generated from the same character area in an image, to generates an electronic document containing the two types of information and a plurality of color information definitions. The two types of information can be switched from each other by a simple operation for selection, because different information is set to be transparent according to the plurality of color information definitions.

The resulting electronic data can be used by a user through an easy switching and selection using a menu on the display/edition program 121. In the present exemplary embodiment, a document can be provided that contains character code data and vector data as a result of recognition of character areas, and the information to be displayed can be switched on an area-by-area basis using the accuracy of character recognition as a reference.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2008-311229 filed Dec. 5, 2008, which is hereby incorporated by reference herein in its entirety.

What is claimed is:

1. An image processing apparatus comprising:

an analysis unit configured to analyze a character area and a character color in an input image;

a character recognition unit configured to obtain character code data by performing character recognition processing on a character image in the character area;

a vectorization unit configured to obtain vector data by performing vectorization processing on a character image in the character area;

a color-information definition generation unit configured to generate a plurality of color information definitions that define colors to be used in rendering the character code data and the vector data based on a rule set for each of the plurality of color information definitions and the character color analyzed by the analysis unit; and an electronic document generation unit configured to generate an electronic document containing the character code data obtained by the character recognition unit, the vector data obtained by the vectorization unit, and the plurality of color information definitions generated by the color-information definition generation unit.

2. The image processing apparatus according to claim 1, wherein the rule is set so that types of data to be transparent are different for each of the plurality of color information definitions.

3. The image processing apparatus according to claim 1, further comprising:

a color information generation unit configured to associate different color IDs to the character code data obtained by the character recognition unit and the vector data obtained by the vectorization unit, both of the data being obtained from the same character image, and wherein the color-information definition generation unit defines colors to be used in rendering the character code data and the vector data by associating the colors to be used in rendering the character code data and the vector data with the associated color IDs, respectively.

4. The image processing apparatus according to claim 3, wherein the color information generation unit associates the same color ID with character images having the same character color in each of the character code data obtained by the character recognition unit and the vector data obtained by the vectorization unit.

5. The image processing apparatus according to claim 1, wherein the color-information definition generation unit defines a rendering color for each of the character code data and the vector data as the character color or the transparent color according to the plurality of color information definitions.

6. The image processing apparatus according to claim 1, wherein the color-information definition generation unit defines a rendering color for each of the character code data and the vector data based on the rule set for each of the plurality of color information definitions, the character color analyzed by the analysis unit, and the recognition accuracy obtained by the character recognition unit.

7. The image processing apparatus according to claim 1, wherein the electronic document generated by the electronic document generation unit is displayed by an application having a user interface through which the plurality of color information definitions are switched for display.

8. The image processing apparatus according to claim 1, wherein the electronic document is generated by the electronic document generation unit in a format used in an application for presentation.

9. An image processing method executed by an image processing apparatus, the method comprising:

analyzing a character area and a character color in an input image by an analysis unit of the image processing apparatus;

performing character recognition processing on the character image in the character area to obtain character code data by a character recognition unit of the image processing apparatus;

performing vectorization processing on the character image in the character area to obtain vector data by a vectorization unit of the image processing apparatus;

generating a plurality of color information definitions that define colors to be used in rendering the character code data and the vector data based on rules set for each of the plurality of color information definitions and the analyzed character color by a color-information definition generation unit of the image processing apparatus; and generating an electronic document that contains the character code data, the vector data, and the plurality of color information definitions by an electronic document generation unit of the image processing apparatus.

10. A computer-readable storage medium storing a computer-executable program, the program causing the computer to function as:

an analysis unit configured to analyze a character area and a character color in an input image;

a character recognition unit configured to perform character recognition processing on a character image in the character area to obtain character code data;

a vectorization unit configured to perform vectorization processing on the character image in the character area to obtain vector data;

a color-information definition generation unit configured to generate a plurality of color information definitions for rendering colors of the character code data and the vector data based on rules set for each of the plurality of color information definitions and the character color analyzed by the analysis unit; and an electronic document generation unit configured to generate an electronic document that contains the character code data obtained by the character recognition unit, the vector data obtained by the vectorization unit, and the plurality of color information definitions generated by the color-information definition generation unit.

* * * * *